US007405545B2

(12) United States Patent
Yang

(10) Patent No.: US 7,405,545 B2
(45) **Date of Patent: *Jul. 29, 2008**

(54) VOLTAGE-REGULATOR AND POWER SUPPLY HAVING CURRENT SHARING CIRCUIT

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/148,821

(22) Filed: Jun. 8, 2005

(65) Prior Publication Data

US 2006/0279269 A1 Dec. 14, 2006

(51) Int. Cl.
*G05F 1/565* (2006.01)
*H02J 1/10* (2006.01)

(52) U.S. Cl. ........................ 323/269; 323/275; 323/350

(58) Field of Classification Search ................. 323/272, 323/269, 268, 271, 350, 275, 277; 363/72, 363/65; 307/32
See application file for complete search history.

(56) References Cited

U.S. PATENT DOCUMENTS 5,157,269 A * 10/1992 Jordan et al. .................. 307/59
5,191,278 A * 3/1993 Carpenter ................... 323/275
5,428,523 A * 6/1995 McDonnal ................... 363/71
5,428,524 A * 6/1995 Massie ......................... 363/79
5,956,245 A * 9/1999 Rozman ....................... 363/89
6,009,000 A * 12/1999 Siri ......................... 363/21.09
6,191,569 B1 * 2/2001 Arbetter et al. ............. 323/272
6,346,798 B1 * 2/2002 Passoni et al. .............. 323/272
6,574,124 B2 * 6/2003 Lin et al. ....................... 363/65
6,788,036 B1 * 9/2004 Milavec et al. .............. 323/272
6,886,066 B2 * 4/2005 Ishii ........................... 710/305
7,002,325 B2 * 2/2006 Harris et al. ................ 323/272
7,235,957 B2 * 6/2007 Yang .......................... 323/272
7,274,251 B2 * 9/2007 Yang .......................... 327/543

* cited by examiner

*Primary Examiner*—Jeffrey Sterrett
*Assistant Examiner*—Harry Behm
(74) *Attorney, Agent, or Firm*—J.C. Patents

(57) ABSTRACT

The present invention proposes a voltage-regulator and a power supply having a current-sharing circuit. The voltage-regulator capable of current sharing uses an enabling terminal as a current-sharing control interface. A pass transistor supplies an output voltage and an output current to an output terminal of the voltage-regulator. A feedback control circuit generates a control signal to control the pass transistor in response to a reference voltage. A current-sharing unit is coupled to the enabling terminal and the feedback control circuit for generating a bus signal in response to the current-sense signal and the reference voltage and generating the reference signal in response to the reference voltage, the bus signal and the current-sense signal.

13 Claims, 8 Drawing Sheets

VOLTAGE-REGULATOR AND POWER SUPPLY HAVING CURRENT SHARING CIRCUIT

BACKGROUND OF THE INVENTION

1. Field of Invention

The present invention relates to a power supply, and particularly to a voltage-regulator and a power supply having a current-sharing control.

2. Description of the Related Art

Voltage-regulators are commonly used in the power management systems of PC motherboards, notebook computers, mobile phones, and many other products. Power management systems use voltage-regulators as local power supplies, where a stable output voltage and a fast transient response are required. Voltage-regulators enable power management systems to supply additional voltage levels that are lower than the primary supply voltage. For example, the 5V power systems of many PC motherboards use voltage-regulators to supply local chipsets with a stable 3.3V voltage.

In spite of poor power converting efficiency, voltage-regulators generally have advantages of low cost, smaller size and little frequency interference. Particularly, voltage-regulators can provide a local circuit with a stable voltage that is unaffected by current fluctuations from other areas of the power system. Voltage-regulators are widely used to power local circuits when the power consumption of the local circuit is negligible with respect to the overall load of a power system.

FIG. 1 shows a typical circuit of a conventional voltage-regulator. Referring to FIG. 1, a voltage-regulator 5 comprises an input terminal IN for receiving an unregulated DC input voltage $V_{IN}$, a pass transistor 10, an output terminal OUT for outputting a regulated DC output voltage $V_O$ and a voltage divider having resistors 31 and 32. The voltage-regulator 5 further comprises a feedback control circuit coupled to the pass transistor 10. The feedback control circuit comprising an error amplifier 20 is connected to the output terminal OUT of the voltage-regulator 5 via the voltage divider. The resistors 31 and 32 are connected in series from the output terminal OUT to a ground terminal GND of the voltage-regulator 5. A voltage-dividing node between the resistor 31 and the resistor 32 is connected to a positive terminal of the error amplifier 20. A reference voltage $V_{REF}$ generated by a band-gap unit 40 is supplied to a negative terminal of the error amplifier 20. An output terminal of the error amplifier 20 generates a gate voltage to a gate of the pass transistor 10. The feedback control circuit regulates the gate voltage for the pass transistor 10 to control the impedance thereof. In response to the gate voltage, the pass transistor 10 supplies the output terminal of the voltage-regulator 5 with various current levels. In this manner, the modulated gate voltages enable the voltage-regulator to output a stable DC voltage regardless of load conditions and input voltage variations.

The voltage-regulator 5 has an enabling terminal EN to enable or disable the voltage-regulator 5 for power management. For example, when a voltage at the enabling terminal EN is lower than a threshold voltage, the voltage-regulator 5 will be disabled. A transistor 11, acts as a switch, is coupled to the enabling terminal EN. Under normal operations, the voltage at the enabling terminal EN is pulled up by a resistor 36 at a high level, namely in an enabled status. When the voltage at the enabling terminal EN is lower than the threshold voltage, the transistor 11 is cut off. Consequently, as the transistor 11 is cut off, through a resistor 35, transistors 12 and 13, and NOT gates 25 and 26, the pass transistor 10 and the error amplifier 20 will be turned off. As the voltage-regulator 5 is disabled, only little quiescent current is consumed for saving power. Thus, the enabling terminal EN is a valuable and necessary interface to enable the voltage-regulator 5 meeting the power management requirement.

One drawback of conventional voltage-regulators is high operation temperature, especially as the input voltage is high. Another drawback is that an output current $I_O$ and a voltage drop $V_D$ of the pass transistor 10 will produce a power consumption $P_D$, which increases an operating temperature of the voltage-regulator 5. Since the lifespan of the voltage-regulator 5 is closely related to the operating temperature thereof, in order to improve the reliability, the operating temperature must be reduced. The operating temperature of the voltage-regulator 5 largely depends on the packaging thereof. The packaging determines a thermal resistance and confines a heat radiation thereof. However, a lower thermal resistance of the packaging increases the manufacturing cost.

SUMMARY OF THE INVENTION

In view of the description above, an object of the present invention is to provide a voltage-regulator and a power supply, which can be connected in parallel for use and equipped with an enabling terminal to enable or disable the voltage-regulator and provides a current-sharing control mechanism.

The present invention provides a voltage-regulator having a current-sharing circuit, which at least has an input terminal, an output terminal and an enabling terminal. The enabling terminal is used to control the voltage-regulator for enabling or disabling and to provide a current-sharing control interface. The voltage-regulator comprises a pass transistor, a band-gap unit, a feedback control circuit and a current-sharing unit. The pass transistor has a first terminal, a second terminal and a third terminal. The first terminal couples to the input terminal to receive an input voltage. The second terminal couples to the output terminal to provide an output voltage and an output current. The band-gap unit generates a reference voltage. The feedback control circuit couples to the output terminal and the pass transistor for detecting the output current and outputting a current-sense signal in response to the output current. The feedback control circuit regulates and outputs a control signal to the third terminal of the pass transistor in response to a reference signal for controlling the voltage-regulator. The current-sharing unit couples to the enabling terminal and the feedback control circuit to generate a bus signal in response to the current-sense signal and the reference voltage. The current-sharing unit further generates the reference signal in response to the reference voltage, the bus signal and the current-sense signal.

The above-described feedback control circuit of the voltage-regulator in an embodiment of the present invention comprises a current-sense unit, a voltage divider and an amplifier. The current-sense unit couples to the pass transistor to detect the output current of the voltage-regulator and to generate the current-sense signal in response to the output current. The voltage divider is coupled to the output terminal to divide the output voltage for generating a feedback voltage. A positive terminal of the amplifier couples to the voltage divider to receive the feedback voltage, a negative terminal thereof receives the reference signal, and an output terminal thereof outputs a control signal used for controlling the pass transistor.

The above-described current-sharing unit of the voltage-regulator in the embodiment of the present invention comprises a pull-up voltage unit, a pull-up resistor, a current generating unit, an input unit, an output unit and a regulating unit. The pull-up voltage unit generates a pull-up voltage in response to the reference voltage. The pull-up resistor is coupled between the pull-up voltage unit and the enabling terminal. The current generating unit generates a first current signal and a second current signal in response to the current-sense signal. The input unit couples to the enabling terminal to generate a third current signal in response to the pull-up voltage and the bus signal. The output unit couples to the enabling terminal to generate the bus signal in response to the second current signal and the pull-up voltage. The regulating unit couples to the input unit and the current generating unit to generate and regulate the reference signal in response to the reference voltage, the first current signal and the third current signal.

The present invention provides a voltage-regulator having a current-sharing circuit, which at least has an input terminal, an output terminal and an enabling terminal. The enabling terminal is used to control the voltage-regulator for enabling or disabling and to provide a current-sharing control interface. The voltage-regulator comprises a pass transistor, a feedback control circuit and a current-sharing unit. The pass transistor has a first terminal couples to the input terminal to receive an input voltage; a second terminal coupled to the output terminal to provide an output voltage and an output current; and a third terminal. The feedback control circuit couples to the output terminal of the voltage-regulator to regulate and output a control signal to the third terminal of the pass transistor in response to a reference signal for controlling an output of the voltage-regulator. The current-sharing unit couples to the enabling terminal and the feedback control circuit to generate the reference signal and regulate the control signal.

The present invention provides a power supply having a current-sharing circuit, which at least has an input terminal, an output terminal and a current-sharing terminal. The power supply comprises an output device, a feedback control circuit and a current-sharing unit. The output device provides an output voltage and an output current to the output terminal of the power supply. The feedback control circuit couples to the output terminal of the power supply and the output device for detecting the output current and outputting a current-sense signal in response to the output current. The feedback control circuit regulates and outputs a control signal to the output device in response to a reference signal to control the output of the power supply. The current-sharing unit couples to the current-sharing terminal and the feedback control circuit. The current-sharing unit generates a bus signal in response to the current-sense signal and the reference voltage and generates a reference signal in response to the reference voltage, the bus signal and the current-sense signal.

The present invention also provides a voltage regulation device using a plurality of voltage-regulators connected in parallel with each other. Therefore, the output current from the voltage regulation device is shared and an output current from each voltage-regulator is decreased, which lowers the operating temperature. Meanwhile, each voltage-regulator is able to detect an output status thereof at any moment and, via the enabling terminal, outputs the bus signal in response to the output status thereof. By this way, each voltage-regulator is able to automatically regulate the output current thereof in response to the bus signal at the enabling terminal thereof, by which the current-sharing function is achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The following embodiments of the present invention are described to explain how enabling terminals of a power supply (for example, a voltage-regulator) are used for turning on/off the voltage-regulator and achieving the current-sharing control. To those skilled in the art, it is obvious that the described scheme is suitable for other types of power supplies and not limited to the presented applications.

Figure 1:
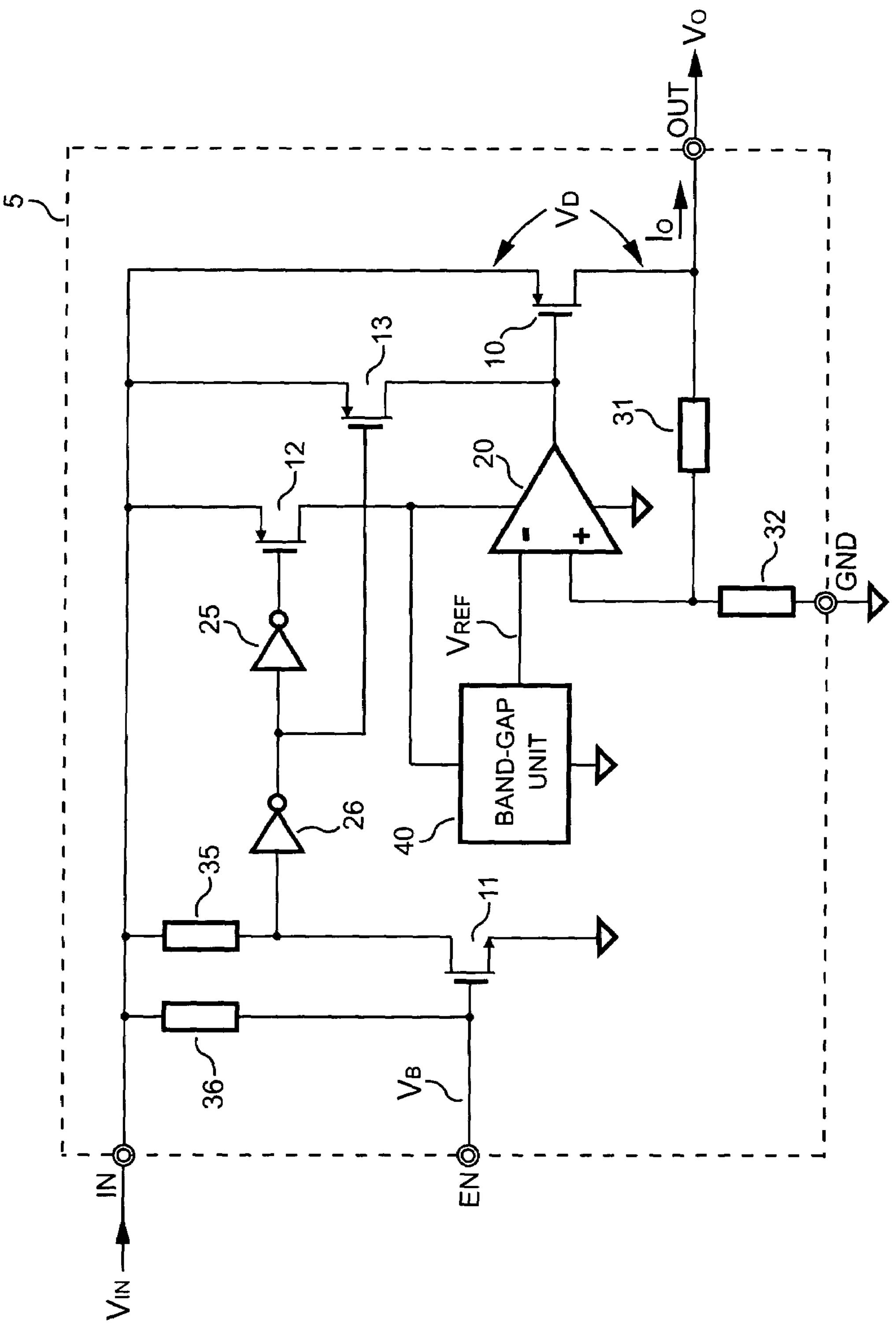
FIG. 1 (Prior Art)
FIG. 1 is a schematic circuit drawing of a conventional voltage-regulator.
Figure 2:
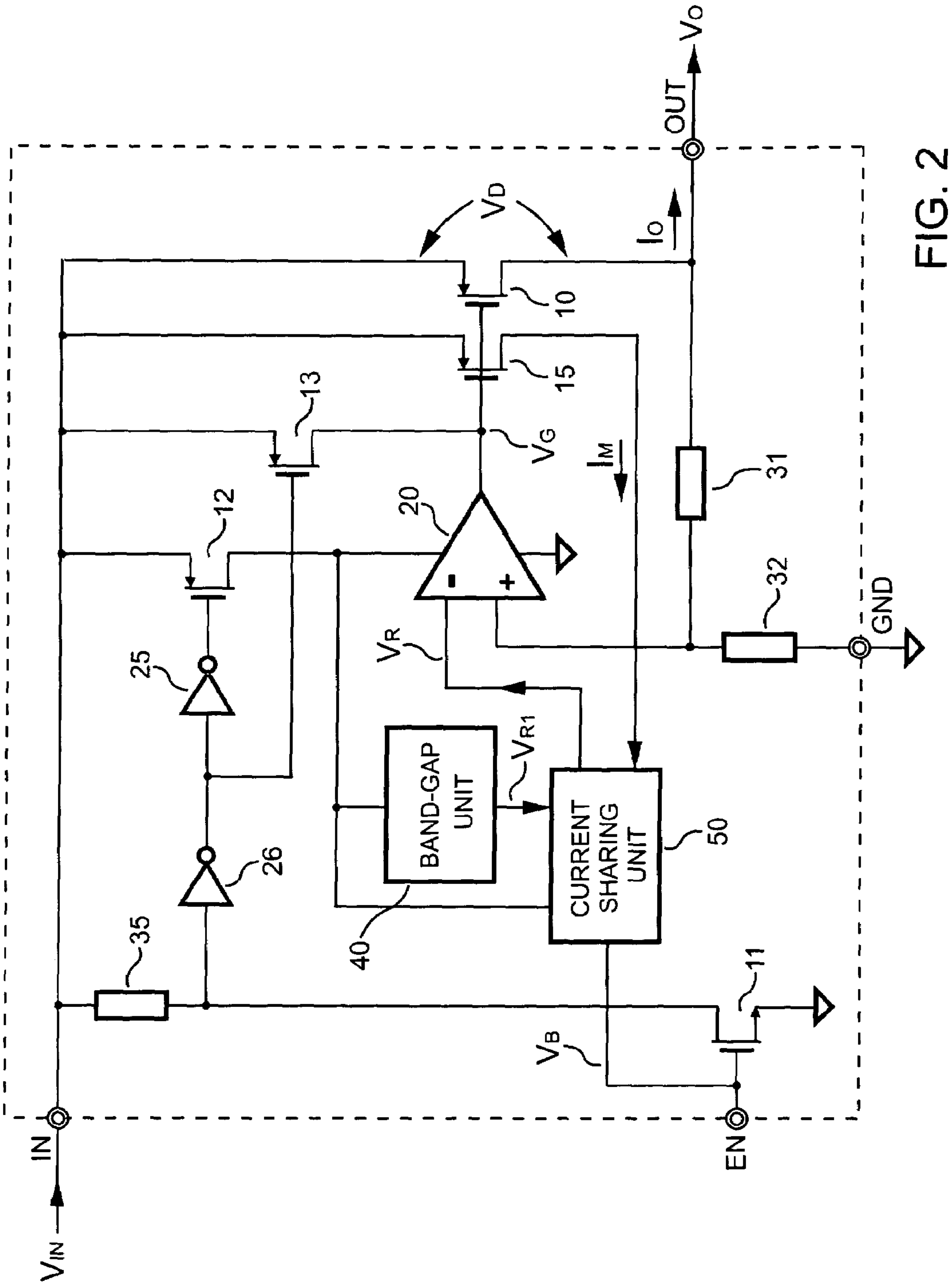
FIG. 2 is a schematic circuit drawing of a voltage-regulator having a current-sharing circuit according to an embodiment of the present invention.

FIG. 2 is a schematic circuit drawing of a voltage-regulator having a current-sharing circuit according to an embodiment of the present invention. Referring to FIG. 2, the voltage-regulator comprises an input terminal IN, an output terminal OUT and an enabling terminal EN. The enabling terminal EN is used to control the voltage-regulator for enabling or disabling and to provide a current-sharing control interface. An output device (for example, a pass transistor 10 in this embodiment) receives an input voltage $V_{IN}$ via the input terminal IN and regulates an output voltage $V_O$ and an output current $I_O$. A band-gap unit 40 generates a reference voltage $V_{R1}$.

A feedback control circuit is coupled to the output terminal OUT and a pass transistor 10 for detecting the output current $I_O$ and outputting a current-sense signal $I_M$ in response to the output current $I_O$. The feedback control circuit regulates a control signal $V_G$ in response to a reference signal $V_R$ and outputs the control signal $V_G$ to a third terminal of the pass transistor 10 for controlling an output of the voltage-regulator. The feedback control circuit comprises a voltage divider and an amplifier 20. The voltage divider is coupled to the output terminal OUT to generate a feedback voltage from the output voltage $V_O$. The voltage divider has resistors 31 and 32 connected in series from the output terminal OUT to a ground terminal. A positive terminal of the amplifier 20 is coupled to the voltage divider to receive the feedback voltage. A negative terminal of the amplifier 20 receives the reference signal $V_R$. The amplifier 20 outputs the control signal $V_G$ to control the pass transistor 10 and regulate the output of the voltage-regulator. A current-sense unit is coupled to the pass transistor 10 to generate the current-sense signal $I_M$ in response to the output current $I_O$. In the embodiment, for example, a transistor 15 serves as the current-sense unit. The transistor 15 and the pass transistor 10 form a current mirror, so that the current-sense signal $I_M$ is generated via a drain of the transistor 15 and is proportional to the output current $I_O$.

A current-sharing unit 50 is coupled to the enabling terminal EN, the band-gap unit 40 and the feedback control circuit for generating and outputting a bus signal $V_B$ to the enabling terminal EN in response to the current-sense signal $I_M$ and the reference voltage $V_{R1}$. The bus signal $V_B$ represents the current level of the output current $I_O$. The current-sharing unit 50 further generates the reference signal $V_R$ in response to the reference voltage $V_{R1}$, the bus signal $V_B$ at the enabling terminal EN and the current-sense signal $I_M$. The amplifier 20 outputs the control signal $V_G$ according to the reference signal $V_R$ to regulate the output of the voltage-regulator.

Figure 3:
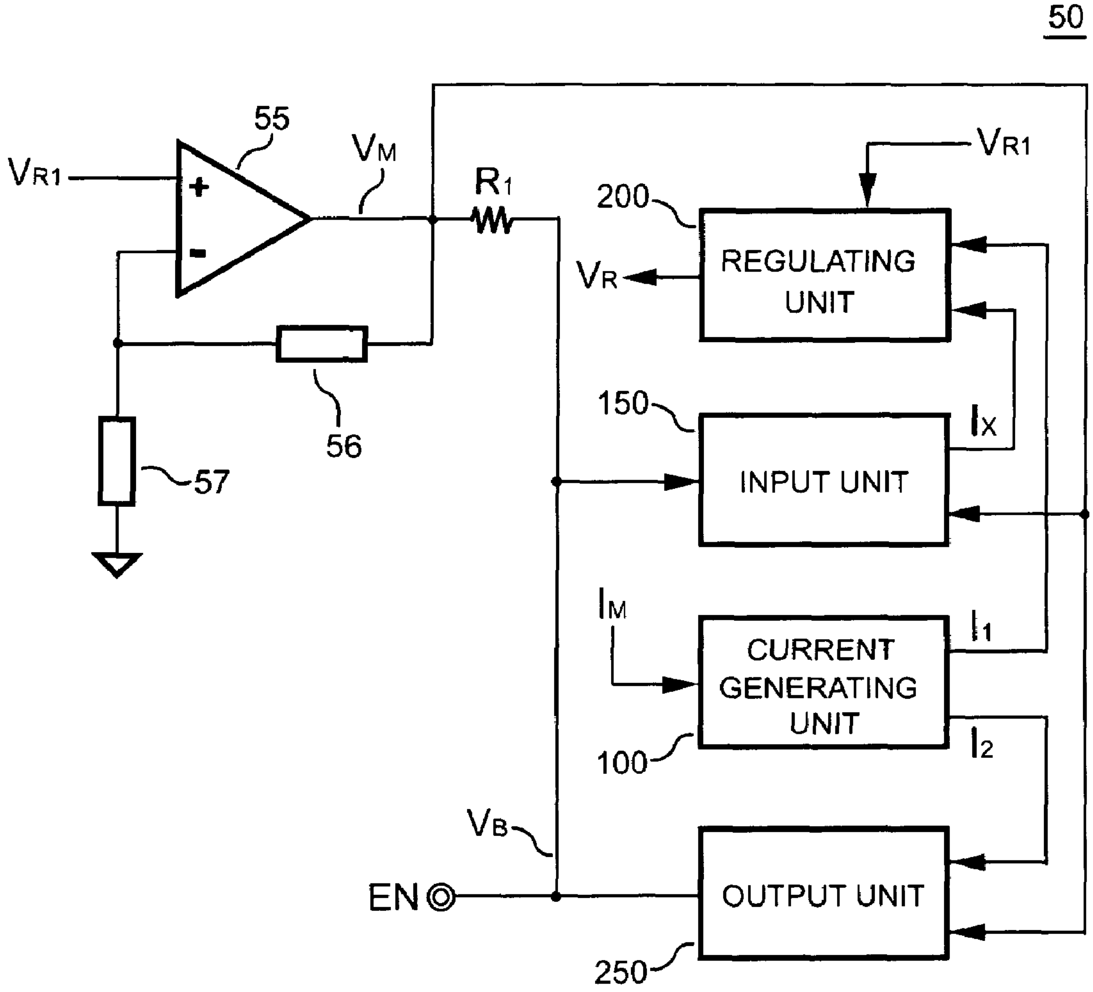
FIG. 3 is a schematic circuit drawing of a current-sharing unit according to an embodiment of the present invention.

FIG. 3 is a schematic circuit drawing of the current-sharing unit 50 according to an embodiment of the present invention. The current-sharing unit 50 comprises a pull-up voltage unit, a pull-up resistor $R_1$, a current generating unit 100, an input unit 150, an output unit 250 and a regulating unit 200. The pull-up voltage unit generates a pull-up voltage $V_M$ according to the reference voltage $V_{R1}$. The pull-up voltage unit comprises an operational amplifier 55, a resistor 56 and a resistor 57. The reference voltage $V_{R1}$ is supplied to a positive terminal of the operational amplifier 55. The pull-up resistor $R_1$ is coupled between the pull-up voltage unit and the enabling terminal EN. The current generating unit 100 generates a first current signal $I_1$ and a second current signal $I_2$ in response to the current-sense signal $I_M$. The input unit 150 is coupled to the enabling terminal EN to generate a third current signal $I_X$ in response to the pull-up voltage $V_M$ and the bus signal $V_B$. The output unit 250 is coupled to the enabling terminal EN to generate the bus signal $V_B$ in response to the second current signal $I_2$ and the pull-up voltage $V_M$. The regulating unit 200 is coupled to the band-gap unit 40, the current generating unit 100 and the input unit 150 to generate and regulate the reference signal $V_R$ in response to the reference voltage $V_{R1}$, the first current signal $I_1$ and the third current signal $I_X$.

Figure 4:
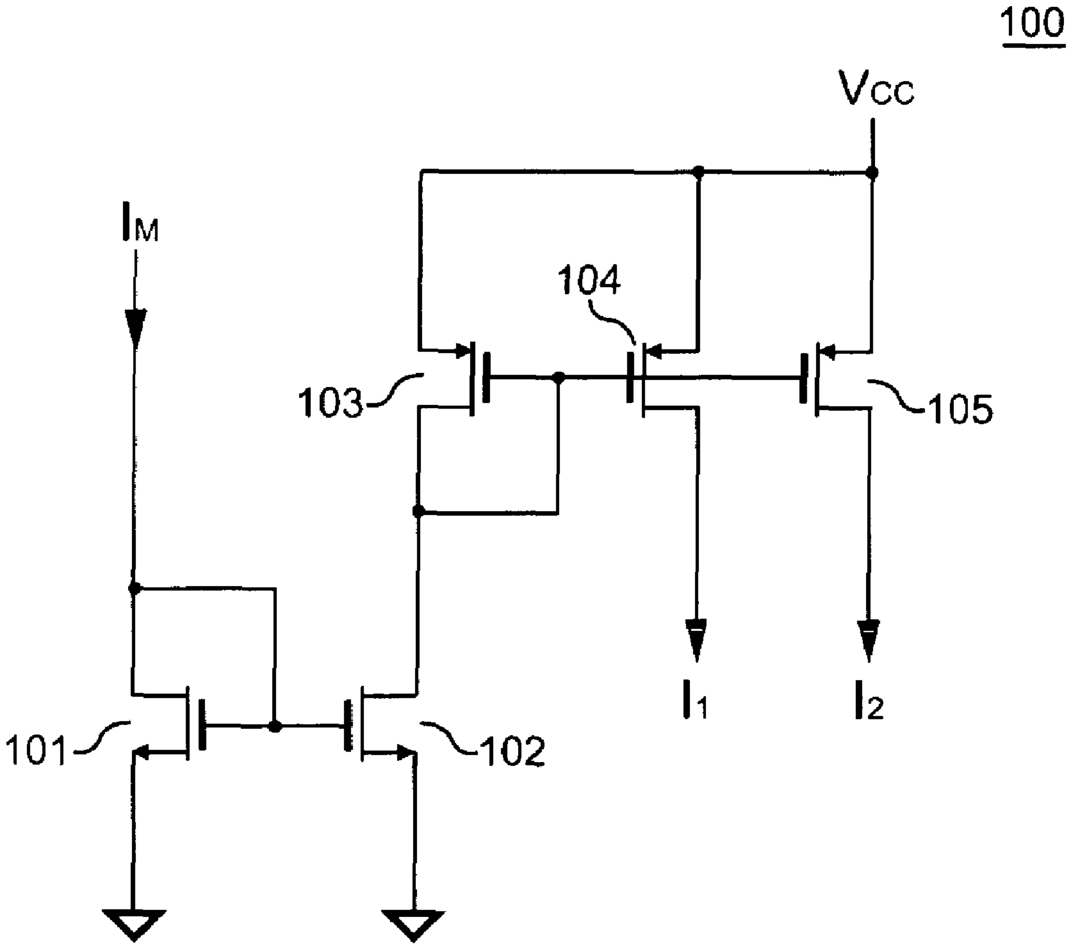
FIG. 4 is a schematic circuit drawing of a current generating unit according to an embodiment of the present invention.

FIG. 4 is a schematic circuit drawing of the current generating unit 100 according to an embodiment of the present invention. By means of a current mirror formed by transistors 101, 102, 103, 104 and 105, the current generating unit 100 generates the first current signal $I_1$ and the second current signal $I_2$ in response to the current-sense signal $I_M$.

Figure 5:
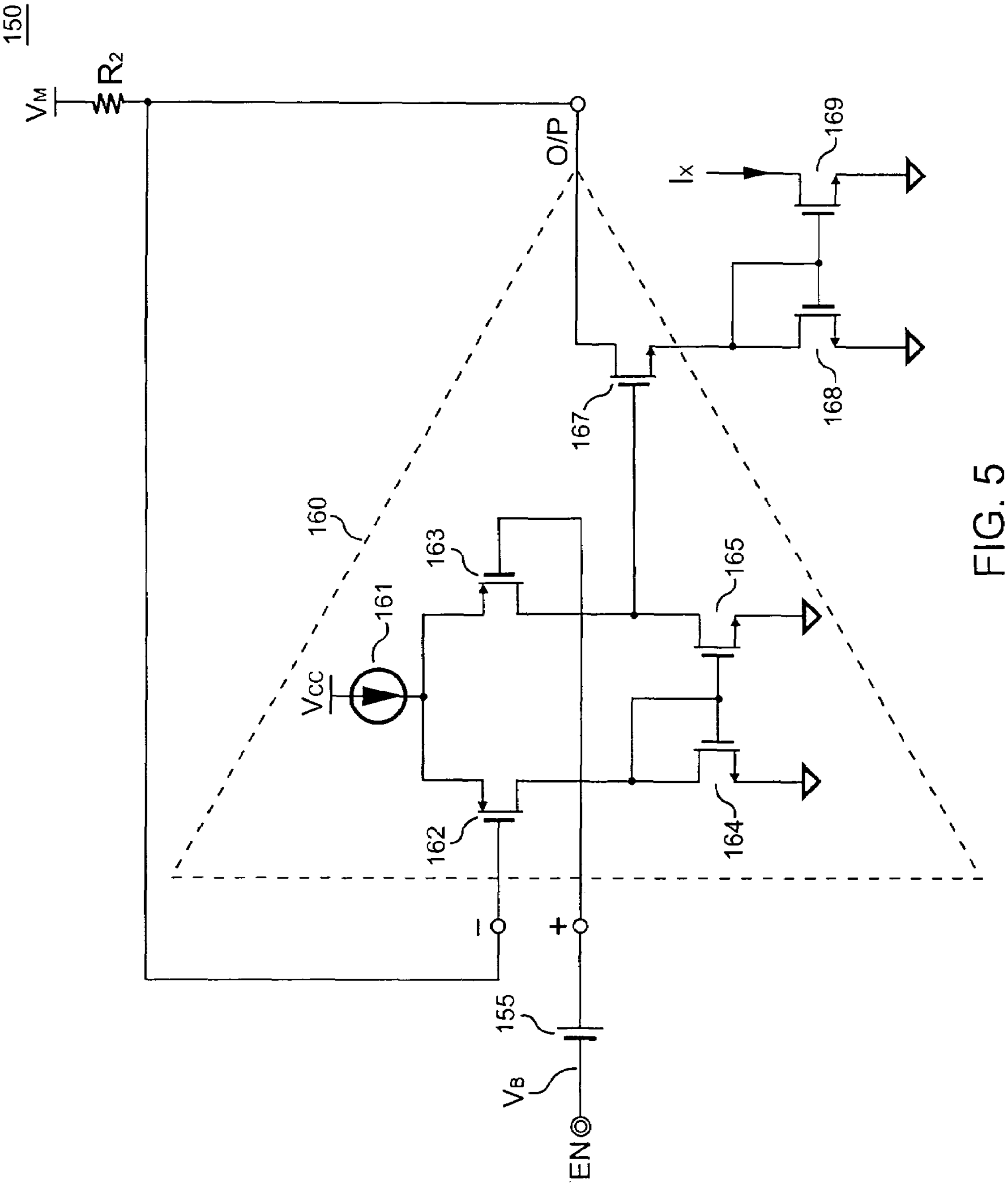
FIG. 5 is a schematic circuit drawing of an input unit according to an embodiment of the present invention.

FIG. 5 is a schematic circuit drawing of the input unit 150 according to an embodiment of the present invention. Referring to FIG. 5, the input unit 150 comprises an input resistor $R_2$ and a buffer amplifier 160. The buffer amplifier 160 has a first output terminal O/P and a second output terminal. At a positive terminal of the buffer amplifier 160 there is an offset voltage 155. The positive terminal thereof is coupled to the enabling terminal EN to receive the bus signal $V_B$. The negative terminal of the buffer amplifier 160 is coupled to the first output terminal O/P thereof. The first output terminal O/P is further coupled to the pull-up voltage $V_M$ via the input resistor $R_2$. The second output terminal of the buffer amplifier 160 generates the third current signal $I_X$ in response to the pull-up voltage $V_M$, the bus signal $V_B$, the offset voltage 155 and a resistance of the input resistor $R_2$.

A power source 161 and transistors 162, 163, 164 and 165 form a differential input stage of the buffer amplifier 160. A transistor 167 is coupled between the transistor 165 and the first output terminal O/P of the buffer amplifier 160. A transistor 168 and a transistor 169 form a current mirror. The transistor 168 is connected to the transistor 167 to receive a current from the first output terminal O/P of the buffer amplifier 160. The transistor 169 outputs the third current signal $I_X$. Thus, the third current signal $I_X$ is proportional to the current from the first output terminal O/P of the buffer amplifier 160. The third current signal $I_X$ can be expressed by the equation (1):

$$I_x = k_1 \times \frac{V_M - (V_B + V_{offset})}{R_2} \tag{1}$$

Where $k_1$ is the ratio of the current mirror formed by the transistors 168 and 169, and $V_{offset}$ is a voltage value of the offset voltage 155.

Figure 6:
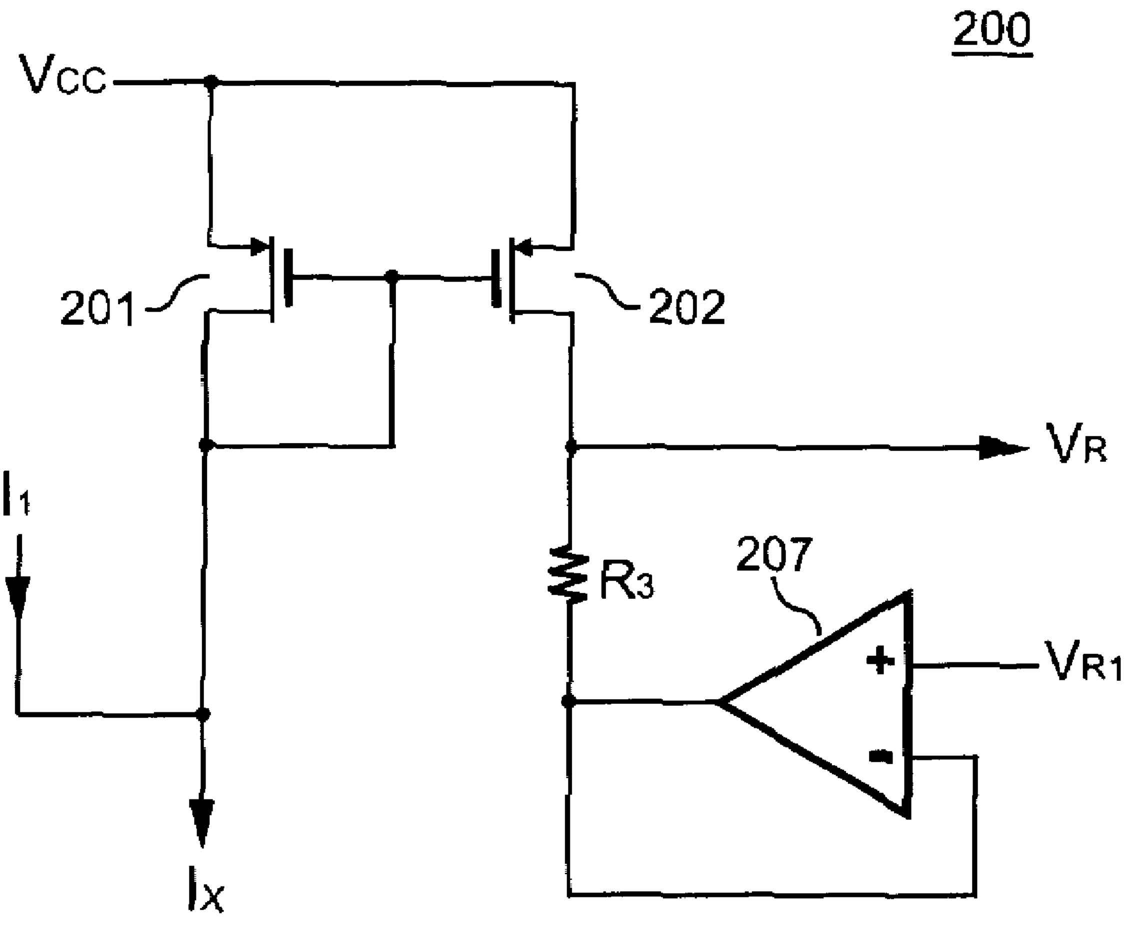
FIG. 6 is a schematic circuit drawing of a regulating unit according to an embodiment of the present invention.

FIG. 6 is a schematic circuit drawing of the regulating unit 200 according to an embodiment of the present invention. Referring to FIG. 6, the regulating unit 200 comprises a regulation current mirror formed by transistors 201 and 202, a regulation resistor $R_3$ and a unit-gain buffer 207. A first current signal $I_1$ and a third current signal $I_X$ are coupled to the transistor 201. The transistor 202 outputs a regulation current signal in response to the first current signal $I_1$ and the third current signal $I_X$. The regulation resistor $R_3$ is connected to the transistor 202 to receive the regulation current signal and generate a reference signal $V_R$. An input terminal of the unit-gain buffer 207 receives the reference voltage $V_{R1}$ and an output terminal thereof is coupled to the regulation resistor $R_3$. The reference signal $V_R$ can be expressed by the equation (2):

$$V_R = V_{R1} + [k_2 \times (I_X - I_1)] \times R_3 \tag{2}$$

Where $k_2$ is the ratio of the regulation current mirror formed by the transistors 201 and 202.

Figure 7:
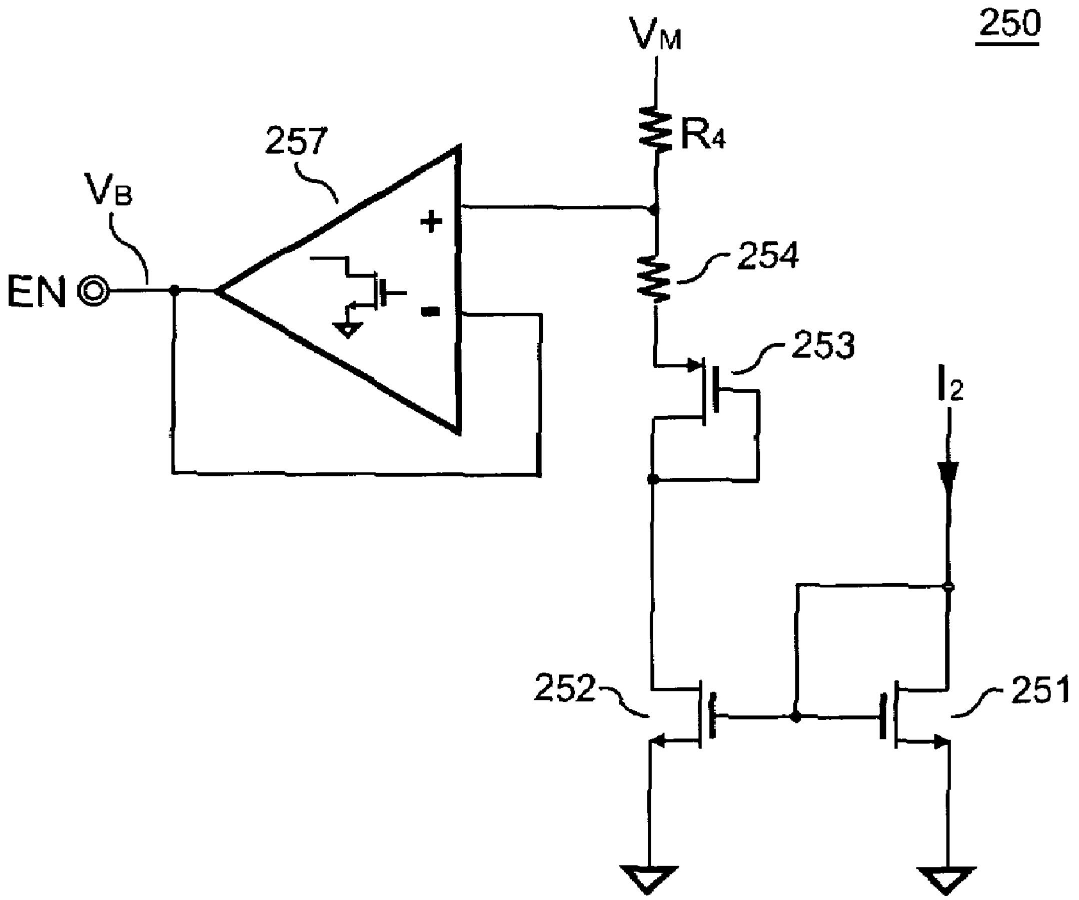
FIG. 7 is a schematic circuit drawing of an output unit according to an embodiment of the present invention.

FIG. 7 is a schematic circuit drawing of the output unit 250 according to an embodiment of the present invention. Referring to FIG. 7, the output unit 250 comprises an output resistor $R_4$, a resistor 254, a diode formed by a transistor 253, a unit-gain amplifier 257 and an output current mirror formed by resistors 251 and 252. The unit-gain amplifier 257 is an open-collector (or open-drain) output type. An output terminal thereof is connected to the enabling terminal EN to generate a bus signal $V_B$. A negative terminal of the unit-gain amplifier 257 is connected to the output terminal thereof. A positive terminal thereof couples to a pull-up voltage $V_M$ via an output resistor $R_4$. The transistor 252 is coupled to the positive terminal of the unit-gain amplifier 257 via the transistor 253 and the resistor 254. The transistor 251 receives the second current signal $I_2$ output from the current generating unit 100. A voltage drop is generated across the output resistor $R_4$ in response to the second current signal $I_2$. Consequently, the bus signal $V_B$ is generated in response to the second current signal $I_2$, a resistance of the output resistor $R_4$ and the pull-up voltage $V_M$. The bus signal $V_B$ can be expressed by the equation (3):

$$V_B = V_M - k_3 \times I_2 \times R_4 \tag{3}$$

Where $k_3$ is the ratio of the current mirror formed by the resistors 251 and 252.

Referring to the equation (3), it can be seen that the bus signal $V_B$ is modulated in response to the output current $I_O$ of the voltage-regulator. Since the output terminal of the unit-gain amplifier 257 is an open-collector (or open-drain) output type, the unit-gain amplifier 257 will only pull down the bus signal $V_B$, thus the enabling terminal EN can be in parallel connection for use. In the no-load condition, a maximum voltage of the bus signal $V_B$ is regulated by the pull-up voltage $V_M$. On the other hand, the transistors 253 and 254 restrain the lowest voltage of the bus signal $V_B$. Thus, a minimum voltage of the bus signal $V_B$ must be higher than the threshold voltage of the transistor 11, which prevents the voltage-regulator from being switched off by the bus signal $V_B$.

Figure 8:
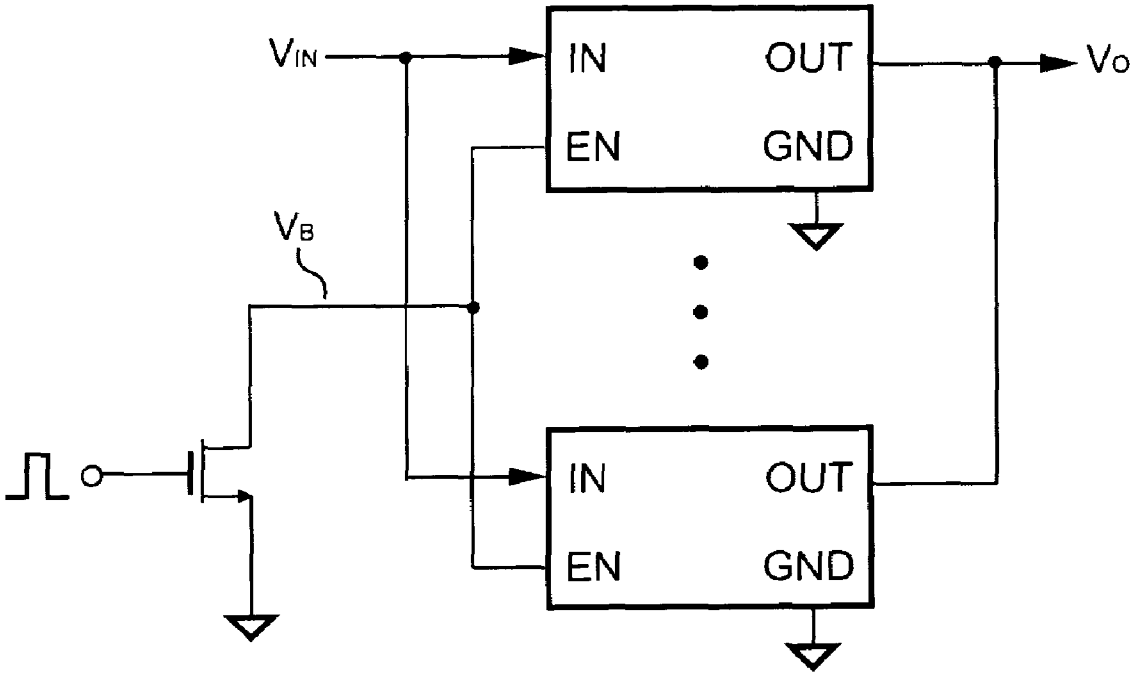
FIG. 8 is a schematic circuit drawing of a voltage regulation device having a plurality of voltage-regulators connected in parallel to each other according to an embodiment of the present invention.

FIG. 8 is a schematic circuit drawing of a voltage regulation device having a plurality of voltage-regulators connected in parallel to each other according to an embodiment of the present invention. Each voltage-regulator has an input terminal IN, an output terminal OUT and an enabling terminal EN. All the input terminals IN of the voltage-regulators together receive an input voltage $V_{IN}$ of the voltage regulation device. All the output terminals of the voltage-regulators commonly supply the output voltage $V_O$ and share the output current $I_O$ for the voltage regulation device. All enabling terminals EN of the voltage-regulators are coupled to each other, so that each enabling terminal EN enables or disables the corresponding voltage-regulator. The voltage-regulator with the largest portion of the output current dominates the bus signal $V_B$. The voltage-regulator dominating the bus signal $V_B$ is accordingly defined as a primary voltage-regulator and others are called as auxiliary voltage-regulators. The auxiliary voltage-regulators trace the bus signal $V_B$ for sharing the output current $I_O$. The auxiliary voltage-regulator generates the third current signal $I_X$ according to the equation (1). The offset voltage $V_{offset}$ determines the threshold value at the beginning. When the bus signal $V_B$ is larger than the offset voltage $V_{offset}$, the auxiliary voltage-regulators start to generate the third current signals $I_X$ and together with the primary voltage-regulator sharing the output current $I_O$. A decrement of the bus signal $V_B$ increases the third current signal $I_X$. Finally, the auxiliary voltage-regulators will increase the output voltage $V_o$ and share the output current $I_O$ thereof. The output voltage $V_O$ is determined by the reference signal $V_R$, which can be expressed by the equation (4):

$$V_O = \frac{R_{31} + R_{32}}{R_{32}} \times V_R \tag{4}$$

Where $R_{31}$, and $R_{32}$ are respectively the resistance of resistors 31 and 32.

The equation (2) indicates that the reference signal $V_R$ can be regulated by the third current signal $I_X$ and the first current signal $I_1$. The first current signal $I_1$ represents the output current $I_O$ of the voltage-regulator. When the third current signal $I_X$ is larger than the first current signal $I_1$, the reference signal $V_R$ increases. An increment of the reference signal $V_R$ increases the output current $I_O$. Finally, along with the increased output current $I_O$, the increment of the reference signal $V_R$ will come to converge. By means of the enabling terminals EN to deliver the bus signal $V_B$ to each other, the output current increments of the auxiliary voltage-regulators will reduce the output current from the primary voltage-regulator, which achieves the current-sharing control.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A voltage-regulator having a current-sharing circuit, comprising at least an input terminal, an output terminal and an enabling terminal, wherein said enabling terminal enables or disables said voltage-regulator and provides a current-sharing control interface, comprising:

a pass transistor, having a first terminal connected to said input terminal of said voltage-regulator to receive an input voltage; a second terminal connected to said output terminal of said voltage-regulator to provide an output voltage and an output current to said output terminal; and a third terminal;

a band-gap unit, for generating a reference voltage;

a feedback control circuit, coupled to said output terminal of said voltage-regulator and said pass transistor for detecting said output current, outputting a current-sense signal in response to said output current, and regulating and outputting a control signal to said third terminal of said pass transistor for controlling said voltage-regulator in response to a reference signal; and a current-sharing unit, coupled to said enabling terminal and said feedback control circuit for generating a bus signal in response to said current-sense signal and said reference voltage and generating said reference signal in response to said reference voltage, said bus signal and said current-sense signal, wherein said current-sharing unit comprises:

a pull-up voltage unit, for generating a pull-up voltage according to said reference voltage;

a pull-up resistor, coupled between said pull-up voltage unit and said enabling terminal;

a current generating unit, for generating a first current signal and a second current signal in response to said current-sense signal;

an input unit, coupled to said enabling terminal for generating a third current signal in response to said pull-up voltage and said bus signal;

an output unit, coupled to said enabling terminal for generating said bus signal in response to said second current signal and said pull-up voltage; and a regulating unit, coupled to said input unit and said current generating unit for generating and regulating said reference signal in response to said reference voltage, said first current signal and said third current signal.

2. The voltage-regulator as recited in claim 1, wherein said feedback control circuit comprises:

a current-sense unit, coupled to said pass transistor for detecting said output current and generating said current-sense signal in response to said output current;

a voltage divider, coupled to said output terminal of said voltage-divider for dividing said output voltage to generate a feedback voltage; and an amplifier, a positive terminal thereof being coupled to said voltage divider for receiving said feedback voltage, a negative terminal thereof for receiving said reference signal, and an output terminal thereof for outputting said control signal to control said pass transistor.

3. The voltage-regulator as recited in claim 1, wherein said input unit comprises:

an input resistor, a first terminal thereof being coupled to said pull-up voltage; and a buffer amplifier, a positive terminal thereof having an offset voltage and being coupled to said enabling terminal for receiving said bus signal, a negative terminal thereof being coupled to a first output terminal thereof and a second terminal of said input resistor, and a second output terminal thereof for generating said third current signal in response to said pull-up voltage, said bus signal, said offset voltage and a resistance of said input resistor.

4. The voltage-regulator as recited in claim 1, wherein said output unit comprises:

an output resistor, a first terminal thereof being coupled to said pull-up voltage;

a unit-gain amplifier, a positive terminal thereof being coupled to a second terminal of said output resistor, an output terminal thereof being connected to said enabling terminal and a negative terminal of said unit-gain amplifier for generating said bus signal, wherein said output terminal of said unit-gain amplifier is an open-collector or open-drain type, wherein said bus signal is generated in response to said second current signal, a resistance of said output resistor and said pull-up voltage; and an output current mirror, coupled to said positive terminal of said unit-gain amplifier for producing a voltage drop across said output resistor in response to said second current signal.

5. The voltage-regulator as recited in claim 1, wherein said regulating unit comprises:

a regulation current mirror, for generating a regulation current signal in response to said first current signal and said third current signal;

a regulation resistor for receiving said regulation current signal to generate said reference signal; and a unit-gain buffer, an input terminal thereof receiving said reference voltage and an output terminal thereof being coupled to said regulation resistor.

6. The voltage-regulator as recited in claim 1, further comprising a switch unit coupled to said enabling terminal for turning on/off said voltage-regulator; wherein when a voltage at said enabling terminal is lower than an on/off threshold voltage, said voltage-regulator is disabled.

7. A voltage-regulator with a current-sharing circuit having at least an input terminal, an output terminal and an enabling terminal, wherein said enabling terminal is used to control said voltage-regulator for enabling or disabling and provide a current-sharing interface, comprising:

a pass transistor, having a first terminal connected to said input terminal of said voltage-regulator to receive an input voltage; a second terminal connected to said output terminal of said voltage-regulator to provide an output voltage and an output current to said output terminal; and a third terminal;

a feedback control circuit, coupled to said output terminal of said voltage-regulator to regulate and output a control signal to said third terminal of said pass transistor in response to a reference signal for controlling an output from said voltage-regulator; and a current-sharing unit, coupled to said enabling terminal and said feedback control circuit for generating said reference signal and regulating said control signal, wherein said current-sharing unit comprises:

a pull-up voltage unit, for generating a pull-up voltage in response to a reference voltage;

a pull-up resistor, coupled between said pull-up voltage unit and said enabling terminal;

a current generating unit, for generating a first current signal and a second current signal in response to a current-sense signal;

an input unit, coupled to said enabling terminal for generating a third current signal in response to said pull-up voltage and a bus signal;

an output unit, coupled to said enabling terminal for generating said bus signal in response to said second current signal and said pull-up voltage; and a regulating unit, coupled to said input unit and said current generating unit for generating and regulating said reference signal in response to said reference voltage, said first current signal and said third current signal.

8. The voltage-regulator as recited in claim 7, further comprising:

a current-sense unit, coupled to said pass transistor for detecting said output current and generating a current-sense signal proportional to said output current; and a switch unit, coupled to said enabling terminal for turning on/off said voltage-regulator; wherein when a voltage at said enabling terminal is lower than an on/off threshold voltage, said voltage-regulator is disabled.

9. The voltage-regulator as recited in claim 7, wherein said current-sharing unit is coupled to said enabling terminal for generating a bus signal according to said output current; said current-sharing unit further generates said reference signal in response to a reference voltage, said bus signal and said output current.

10. The voltage-regulator as recited in claim 7, wherein said feedback control circuit comprises:

a voltage divider, coupled to said output terminal of said voltage-regulator for dividing said output voltage to generate a feedback voltage; and an amplifier, a positive terminal thereof being coupled to said voltage divider for receiving said feedback voltage, a negative terminal thereof for receiving said reference signal, and an output terminal thereof for outputting said control signal to control said pass transistor.

11. The voltage-regulator as recited in claim 7, wherein said input unit comprises:

an input resistor, a first terminal thereof being coupled to said pull-up voltage; and a buffer amplifier, a positive terminal thereof having an offset voltage and being coupled to said enabling terminal for receiving said bus signal, a negative terminal thereof being coupled to a first output terminal thereof and a second terminal of said input resistor, and a second output terminal thereof for generating said third current signal in response to said pull-up voltage, said bus signal, said offset voltage and a resistance of said input resistor.

12. The voltage-regulator as recited in claim 7, wherein said output unit comprises:

an output resistor, a first terminal thereof being coupled to said pull-up voltage;

a unit-gain amplifier, a positive terminal thereof being coupled to a second terminal of said output resistor, an output terminal thereof being connected to said enabling terminal and a negative terminal of said unit-gain amplifier for generating said bus signal, wherein said output terminal of said unit-gain amplifier is an open-collector type; wherein said bus signal is generated in response to said second current signal, a resistance of said output resistor and said pull-up voltage; and an output current mirror, coupled to said positive terminal of said unit-gain amplifier for generating a voltage drop across said output resistor in response to said second current signal.

13. The voltage-regulator as recited in claim 7, wherein said regulating unit comprises:

a regulation current mirror, for generating a regulation current signal in response to said first current signal and said third current signal;

a regulation resistor, for receiving said regulation current signal to generate said reference signal; and a unit-gain buffer, an input terminal thereof receiving said reference voltage and an output terminal thereof being coupled to said regulation resistor.

* * * * *